2 Sheets—Sheet I.

H. B. COYLE.

BEDSTEAD.

No. 7,396. Reissued Nov. 21, 1876.

Witnesses
Saml. J. Van Stavoren
Jos. B. Connolly

Hugh B. Coyle Inventor
By Connolly Bros
Attorneys

2 Sheets—Sheet 2.

H. B. COYLE.

BEDSTEAD.

No. 7,396. Reissued Nov. 21, 1876.

Witnesses

Saml. J. Van Stavoren.

Jos. B. Connolly

Inventor

Hugh B. Coyle,

By Connolly Bros Attorneys

UNITED STATES PATENT OFFICE.

HUGH B. COYLE, OF PHILADELPHIA, PENNSYLVANIA.

IMPROVEMENT IN BEDSTEADS.

Specification forming part of Letters Patent No. 127,312, dated May 28, 1872; reissue No. 7,396, dated November 21, 1876; application filed September 14, 1876.

*To all whom it may concern:*

Be it known that I, HUGH B. COYLE, of Philadelphia, in the county of Philadelphia, State of Pennsylvania, have invented certain Improvements in Bedsteads, of which the following is a specification, reference being had to the annexed drawings, forming part of this specification, wherein—

Figure 1:
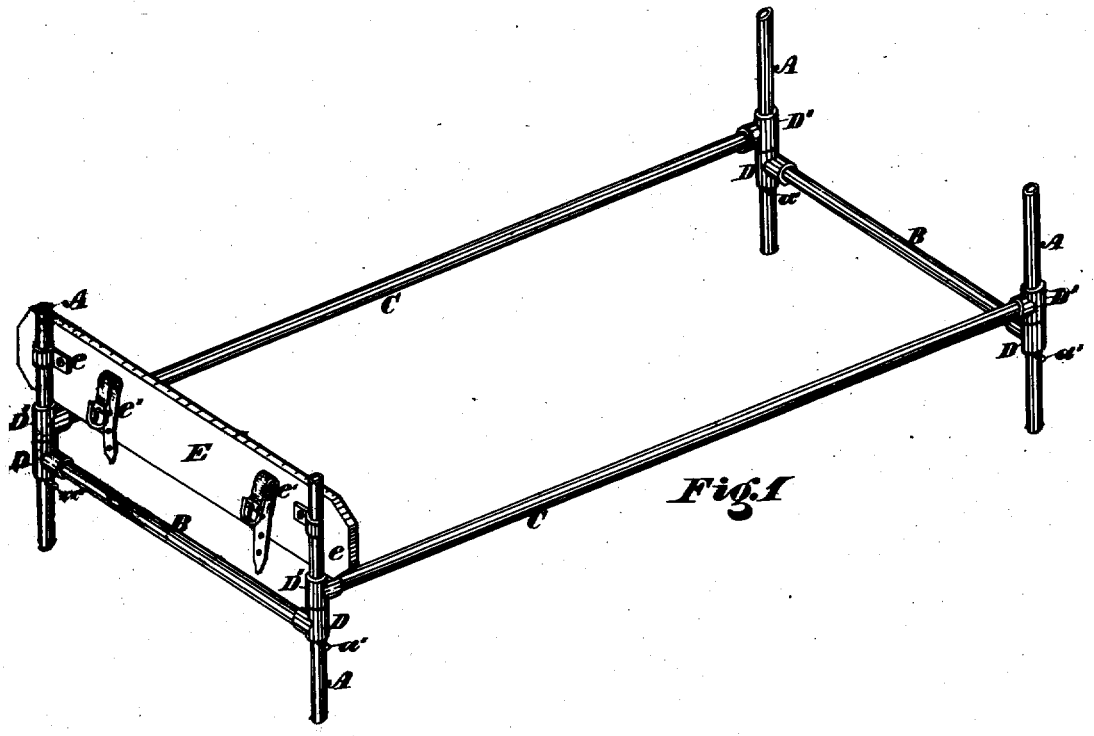
Figure 2:
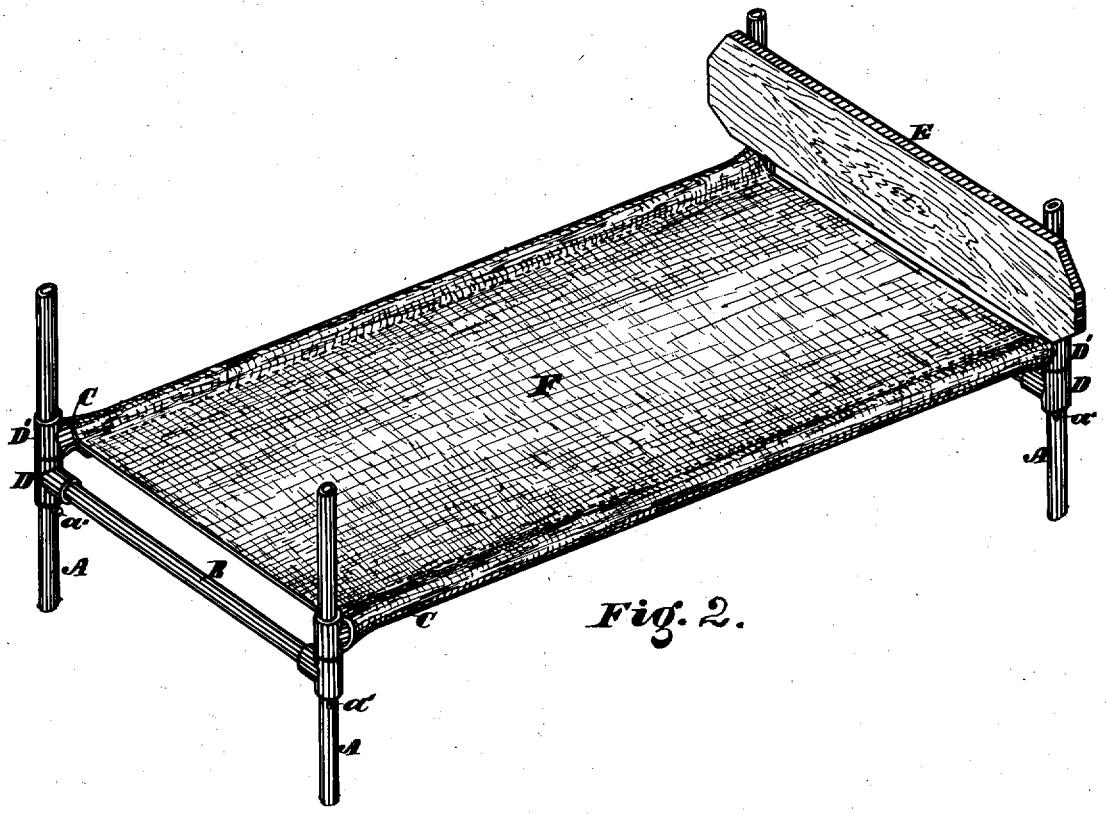
Figure 3:
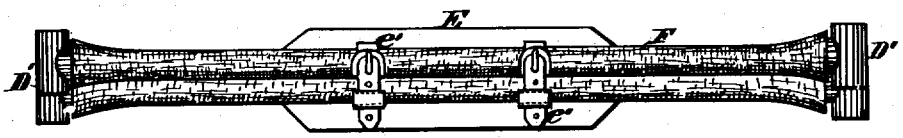

Figure 1 is a perspective view of bedstead with sacking bottom removed. Fig. 2 is a perspective view of bedstead with sacking bottom, and Fig. 3 is a plan view of parts folded for transportation.

The primary object of my invention is to utilize iron piping in the construction of bedsteads of a portable nature, said material possessing in an eminent degree the desired and necessary qualities of cheapness, lightness, relative strength, and durability. A further object of my invention is to provide a bedstead which may be readily taken down and folded in very compact form when transportation is desired.

In carrying my invention into effect I take common gas or other piping of suitable sizes to form the legs or posts and side and end rails of the bed. On each end of said rails I screw an ordinary T-coupling, the cross or head of said coupling having a smooth bore, through which the legs or posts slide. Lateral pins or studs are inserted in said legs to sustain the rails at a proper altitude. A bottom of suitable material—for illustration, sacking or linen duck—is laid or stretched upon the rails, affording a couch or support for a mattress.

Referring to the accompanying drawing, A A designate posts formed of piping, having lateral pins or studs *a′ a′*. B B are the end and C C the side rails, on which are screwed T-couplings D D′, through which slide the posts A A. The couplings D rest upon the studs *a′*, while upon said couplings D rest the others, D′. The crosses of the couplings, or parts through which the posts pass, are formed or turned with a smooth bore of just sufficient diameter to accommodate said posts. E is a head-board, provided with sockets *e e*, composed of straps, staples, or other devices, by means of which it is slipped on the posts A A, and with straps *e′ e′*, which serve to hold the parts together when folded for transportation, as hereinafter more fully described. F is a sacking bottom, (for which a bottom of any other suitable material may be substituted,) formed at each of its two longest edges with a fold or pocket through which the side rails or rods pass. The said bottom may be further fastened to the rods or rails by cords wound over both at the corners of the former.

Other methods of fastening, such as rivets, &c., may be employed for fastening the bottom in place, and said bottom may be made detachable from the rails or otherwise.

In lieu of the pins *a′*, rings firmly fastened on the posts A may be employed for the same purpose.

To put the bed together the posts are passed through the sockets on the ends of the rails and through the staples on the back of the head-board. This constitutes the frame of the bed, which is completed by the addition of a suitable bottom, as already described.

When the bed requires to be transported the head-board is first slipped off the posts and the latter then withdrawn from the couplings. The side and end rails (wrapped in the sacking bottom, if the latter be used and retained) are then laid longitudinally on the head-board, and fastened thereto by means of straps.

What I claim as my invention is—

1. A folding bed-frame composed of rails having at each end a T-socket, through which the posts slide, the rails with their sockets being each separate and independent of the others, to facilitate the erection and folding of the bed, substantially as shown and described.

2. The combination of the posts A, having shoulders *a′* and rails B C, having separate T-couplings D D′, the said parts being combined and arranged to form a folding bed-frame, substantially as shown and set forth.

3. The head-board E, having sockets *e*, composed of straps, staples, or equivalent devices for securing it on the posts, substantially as shown and described.

4. The combination, with said head-board, of straps *e′* for holding the parts together when packed for transportation, as set forth.

In testimony that I claim the foregoing I have hereto set my hand this 28th day of June, A. D. 1876.

HUGH B. COYLE.

Witnesses:

CHAS. F. VAN HORN,

M. DANL. CONNOLLY.